(12) United States Patent
Wubu

(10) Patent No.: US 11,104,413 B2
(45) Date of Patent: Aug. 31, 2021

(54) FLIGHT ASSEMBLY AND METHOD FOR FLIGHT THEREOF

(71) Applicant: Haile E. Wubu, Copperas Cove, TX (US)

(72) Inventor: Haile E. Wubu, Copperas Cove, TX (US)

(*) Notice: Subject to any disclaimer, the term of this patent is extended or adjusted under 35 U.S.C. 154(b) by 235 days.

(21) Appl. No.: 16/251,753

(22) Filed: Jan. 18, 2019

(65) Prior Publication Data

US 2020/0231269 A1     Jul. 23, 2020

(51) Int. Cl.
*B64C 3/56*         (2006.01)
*B64C 31/02*        (2006.01)

(52) U.S. Cl.
CPC .............. *B64C 3/56* (2013.01); *B64C 31/02* (2013.01)

(58) Field of Classification Search
CPC ......... B64C 3/56; B64C 31/02; B64C 31/024; B64C 31/028; B64D 17/80; B64D 10/00
See application file for complete search history.

(56) References Cited

U.S. PATENT DOCUMENTS

| | | | | |
|---|---|---|---|---|
| 544,816 A | * | 8/1895 | Lilienthal | B64C 31/02 244/16 |
| 6,073,882 A | * | 6/2000 | Zieger | B60F 5/02 244/124 |
| 6,322,021 B1 | * | 11/2001 | Fisher | B64C 31/024 244/137.3 |
| 2002/0195519 A1 | * | 12/2002 | Geissler | B64D 10/00 244/16 |
| 2015/0102155 A1 | * | 4/2015 | Krastev | B64C 3/56 244/2 |
| 2015/0210389 A1 | * | 7/2015 | Murdock | B64C 33/025 244/22 |

* cited by examiner

*Primary Examiner* — Rodney A Bonnette
(74) *Attorney, Agent, or Firm* — Monarch IP Group, PLLC; April M. Mosby

(57) ABSTRACT

A flight assembly and glider possessing bilateral, flexible, and collapsible wings and associated method of flight are provided. The flight assembly may include a central frame that may encapsulate a human operator. A wing frame may include at least a pair of wings that couple to the central frame, wherein each wing may include one or more pivotal connections. To control the extension and retraction of the pair of wings, a control lever network may be incorporated within the central frame and the wing frame. The control lever network may include wing sail deployment, flight deceleration and parachute wing conversion features.

17 Claims, 8 Drawing Sheets

FLIGHT ASSEMBLY AND METHOD FOR FLIGHT THEREOF

BACKGROUND

Aeronautical flight has evolved over the past two centuries to include a great variety of apparatuses, systems, and methods associated therewith. Apparently, there are four different categories for flight: hang gliding, human wings, aircraft, and satellite. Conventional designs for solo, human-operated flight apparatus may include hang gliders and human wings. Hang gliders have evolved from a modified design of the parachute, while human wings have evolved from the study of the natural form of man and birds.

Unfortunately, hang gliders are quite cumbersome and inefficient. In particular, the conventional hang glider forces a user to take the glider to the highest point of a mountain or hill; wherein, the disassembled glider must be packed away in an automobile, only to have the user reassemble the hang glider just prior to flight. In particular, if the user is a beginner, carrying a heavy hang glider up the hill can be burdensome. In addition, when the hang glider is assembled, the hang glider may be exposed to strong gusts of wind that may drag the user and the hang glider away. For the more advanced user, an unassembled hang glider must driven to the highest point of a mountain using a car or truck; and then it must be re-assembled in preparation for flight. Once the user has landed, the hang glider must be disassembled and repacked into the vehicle, in order to be driven to another mountain for another flight experience. With all of the steps of disassembling, reassembling, and disassembling for transport, most users may be more exhausted than thrilled by their flight experience.

In contrast, human wings may offer a true to form human exoskeleton. As such, human wings may be a more convenient choice over hang gliders. Additionally, human wings have an enhanced safety factor due to the increased ease of control. Yet, the problem with many of the conventional designs is that they lack in functionality and operability.

It is within this context that the embodiments arise.

SUMMARY

Embodiments of an apparatus and method for flight are provided. It should be appreciated that the present embodiment can be implemented in numerous ways, such as a process, an apparatus, a system, a device, and/or a method. Several inventive embodiments are described below.

In some embodiments, a flight assembly and glider are provided. The flight assembly and glider may possess bilateral, flexible, and collapsible wings. In particular, the flight assembly may include a central frame that may encapsulate a human operator. A wing frame may include at least a pair of wings that couple to the central frame, wherein each wing may include one or more pivotal connections. To control the extension and retraction of the pair of wings, a control lever network may be coupled to the central frame and the wing frame. For example, in some embodiments the control lever network may be coupled to the wing frame to control extension and retraction of the pair of wings at the pivotal joints. The control lever network may be comprised of a set of cables and levers coupled to specific elements of the wings frame and the central frame. In particular, the control lever network may include an upper arm lever coupled to the wing frame to extend and retract the wings. The control lever network may further include a forearm control assembly coupled to the wing frame by a first cable to tilt the wing for enhancing drag to implement a flight deceleration and breaking feature of the flight apparatus. The hand lever control may also control wing sail deployment, vertical descent positioning of the flight assembly (flight deceleration), and parachute wing conversion.

In some embodiments, a method of flight is provided. The method may include accelerating the flight apparatus worn by a user through the air through running or leaping off an elevated rise in an action. For example, the user, wearing the flight apparatus, may leap off of an incline, wherein the flight apparatus may include a central frame coupled to a wing frame having a pair of wings. Next, the method may include adjusting an upper-arm lever to open the wing frame, wherein each wing includes one or more sail panels. For example, the upper-arm lever may be engaged by the user to open the wing frame, extending the wings. Further, in an action, the method may include toggling a sail lever to deploy the sail. For example, the user may toggle the sail lever to release the one or more sail panels form the pair of wings.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1A:
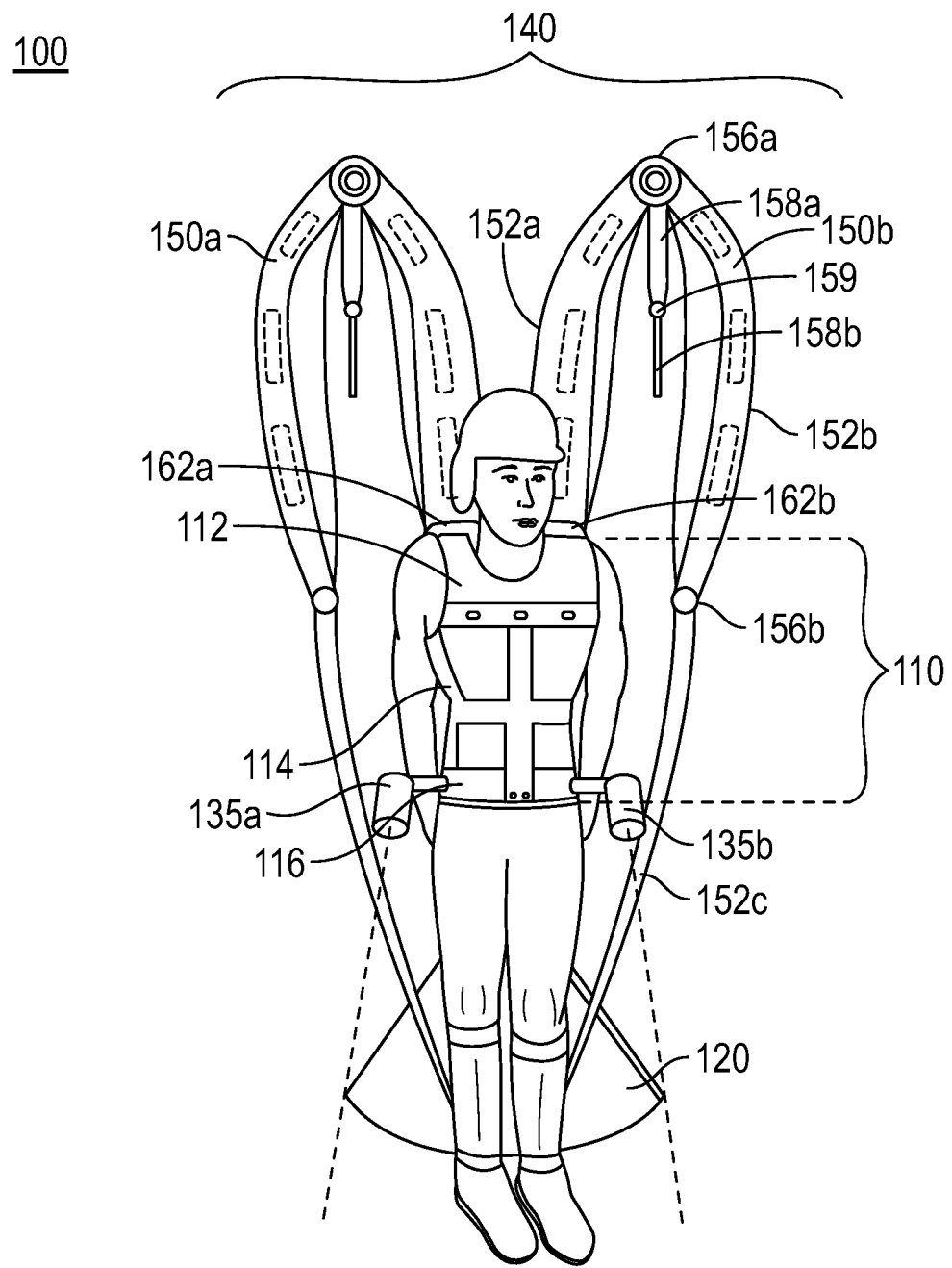
FIG. 1A is a perspective view of a flight assembly in the retracted wing posture, in accordance with some embodiments.

The following embodiments describe a flight assembly and method for flight thereof. It can be appreciated by one skilled in the art, that the embodiments may be practiced without some or all of these specific details. In other instances, well known process operations have not been described in detail in order not to unnecessarily obscure the embodiments.

The flight assembly and glider possessing bilateral, flexible, and collapsible wings and associated method of flight are provided. The flight apparatus may include a central frame that encapsulates a human operator. In some embodiments, the central frame may comprise a shoulder girdle for coupling across the shoulders of the user and housing a parachute. The central frame may further include a front brace and pair of side braces coupled to the shoulder girdle and a belt for covering the torso portion of the user. A rear post may be included to cover the back of the user and to provide a cradle feature for the user's legs and feet during in-flight wing posture. The flight apparatus may further include a wing frame coupled to the central frame. The wing frame including at least a pair of wings may couple to the central frame, wherein each wing includes one or more pivotal connections. The wing frame may include a pair of wing arms that house a plurality of sail panel sections that can be deployed when the wing frame is expanded. In particular, the wing sail deployment mechanism may couple to actuate the plurality of sail panels when the wing frame is expanded. The flight apparatus may further include a control lever network to control the extension and retraction of the pair of wings. This control lever network may be incorporated within the central frame and the wing frame. The control lever network may also include a feature for expanding and retracting the wings upon demand using an upper arm lever and control mount assembly including a wing plate mount of the wing frame and crankshaft disc. The control lever network may also include a hand lever for shifting the wing frame in one of two positions: a in-flight (horizontal) wing posture for flight and a vertical wing posture for vertical descent.

The advantages of the flight assembly and method disclose herein include convenience and ergonomic efficiency. The exoskeleton attribute of the flight assembly greatly enhances the safety factor of the device, since the assembly can be easier to control. As opposed to hang gliders, beginner users are enabled to carefully balance their arms and have use of their other extremities. The flight assembly can be easily carried up a slope or a small hill, eliminating any impact from strong gusts of wind, which may carry away other types of conventional flight apparatuses such as the hang glider. For the more advanced user, a launch from a mountain can be performed at any level of the mountain without having to drive up to the highest point and fully assembled the flight apparatus. The user may at anytime rapidly and naturally deployed the wing frame. The flight assembly disclosed herein has the flexibility and versatility of landing in tactical fashion, whereby the user may land along side any ridge any surface with adequate room to stand. Since the wing frame is mounted upon the users back, the wings are capable of being easily and rapidly extended or retracted.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1A, a perspective view of a flight assembly in the retracted wing posture, in accordance with some embodiments, is shown. The flight assembly may include a central frame 110, a wing frame 140, and a control lever network (not shown). The wing frame 140 may include a primary joint 156a and a secondary joint 156b. The primary joint 156a may comprise a wing deployment utility, which will be explained more in detail with reference to FIG. 2. The central frame 110 may encapsulate the user and serve to provide rigid support and protection of the user. This central frame may include a shoulder girdle 112, a front brace 118, a pair of side braces 114, a rear post 120, and a belt 116. The front brace 118 may couple to the shoulder girdle 112 with detachable coupling members, including but not limited to a plurality of one or more snaps, buttons, zippers, clips, fasteners, and the like. The belt 116 and the pair of side braces 114 can couple around the user to fully support the user's upper body, wherein the side braces 114 couple to the shoulder girdle 112. The rear post 120 may also couple to the belt 116. The belt 116, pair of side braces 114, and the rear post 120, with may couple together with detachable coupling members, including but not limited to a plurality of one or more snaps, buttons, zippers, clips, fasteners, and the like. The rear post 120 serves to protect the spine and support the lower body of the user. In contrast, the front brace 118 serves to protect and shield the sternum of the user and upper body of the user. Further, the rigid belt 116 can serve as a pelvic girdle. The central frame can also serve as a means to move or immobilize the wing frame (as will be discussed in more detail with reference to FIGS. 2-8B).

In some embodiments, the wing frame 140 may include a pair of wings (150a, 150b) having one or more pivotal connections or joints (156a, 156b). The wing frame may be segmented into one a more pair of wing arms (150a, 150b) that are coupled to the central frame 110 at a pair of wing mount plates (162a 162b). The wing frame 140 may include a pair of wing mount bars (FIG. 3A, 164a, 164b), having wing mount posts (FIG. 4A, 178 shows one of the pair of wing mount posts), which couple directly into a recess of the wing mount plate 162 (to be discussed in further detail with reference to FIGS. 3A, 4A, and 4B). In some embodiments as shown, each wing arm (150a, 150b) may have a primary segment 152a, a secondary segment 152b, and a tertiary segment 152c. Each one of these segments may encapsulate one or more wing sail panel sections (not shown). In some embodiments, the primary segment 152a may couple to a wing mount plate 162 that couples to the central frame 110 as shown. At the first joint 156a, the wing frame 140 may include a wing sail deployment mechanism 158 (158a, 158b). In particular, the wing sail deployment mechanism 158 may include a central shaft 158b surrounded by concentric rings of tubular columns 158a, which engage when the wings (150a,150b) are extended. In particular, the concentric rings of tubular columns 158a may slidably couple to the central shaft 158b. A disc 159, coupled to a torsion spring (134a-d), may be coupled between the tubular columns 158a and the central shaft 158b to prohibit the tubular columns 158a from shifting in a downward motion when the wings 150 are retracted up in the position shown in FIG. 1. When the wings are extended as shown in FIG. 2, however, the disc 159 can rotate and pull a set of cables (not shown) connected to each one of the concentric rings of tubular columns 158 down. Each one of the tubular columns 158a may be connected to the wing sail panel sections (160a, 160b of FIG. 2) that are attached and concealed within the wing arms (152a, 152b, 152c). The wing sail deployment mechanism (158a, 158b) and wing sail panel sections (160a, 160b) will be explained in further detail with reference to FIG. 2. Advantageously, the combination of the streamlined aerodynamic form and placement of the wings at the shoulder region causes the drag force to be reduced significantly. The minimal drag force contributes greatly to a better lift-to-drag ratio.

In some embodiments, the control lever network may be coupled to the wing frame to control extension and retraction of the pair of wings (150a, 150b) at the pivotal joints (156a, 156b). The control lever network (FIGS. 1B, 2, 3A, and 4A; 130a-d, 153, 166, 161a, 161b, 161c, 161d, 190, 165b, 167a, 167a, 164b, 162b, 167b, 170a, 170b, 173a, 173b) may be comprised of a set of cables and levers coupled to specific elements of the wings frame 140 and the central frame 110. The control lever network (FIG. 3A; 166, 161a, 161b, 161c, 161d, 190, 165b, 167a, 167a, 164b, 162b, 167b) may include an upper arm lever (FIG. 3A; 166) coupled to the wing frame 140 to extend and retract the wings (150a, 150b). The control lever network may further include a forearm control assembly (FIG. 3A; 161a, 161b, 161c, 161d, 190, 167a, 167b) coupled to the wing mount bar (FIG. 3A; 164a, 164b) by a first cable (FIG. 3A; 167a, 167b) to tilt the wing frame 140 for enhancing drag to implement a flight deceleration and breaking feature of the flight apparatus. The control lever network (FIGS. 1B, 2, 3A, and 4A; 130a-d, 153, 166, 161a, 161b, 161c, 161d, 190, 165b, 167a, 167a, 164b, 162b, 167b, 170a, 170b, 173a, 173b) may also include a hand lever control (170a, 170b) may also control wing sail deployment, flight deceleration, and parachute wing conversion. Through the use of a cabling system, a parachute (FIG. 6, 185) may be deployed. The details of the control lever network will be discussed further with reference to FIGS. 2-6.

The design of the flight assembly 100 affects the superior steering capacity with respect to yaw, pitch, and roll movements. The flight assembly 100 disclosed herein is designed to be more stable in contrary wind directions and speed. A ventilation system (not shown) can be implemented at the joints (156a, 156b) including one or more longitudinal slots that allow for wind currents to circumvent, wherein the joints slightly rotate to allow for movement in alignment with strong when forces. This enables the user to move at a very slow rate of speed without stalling.

Figure 1B:
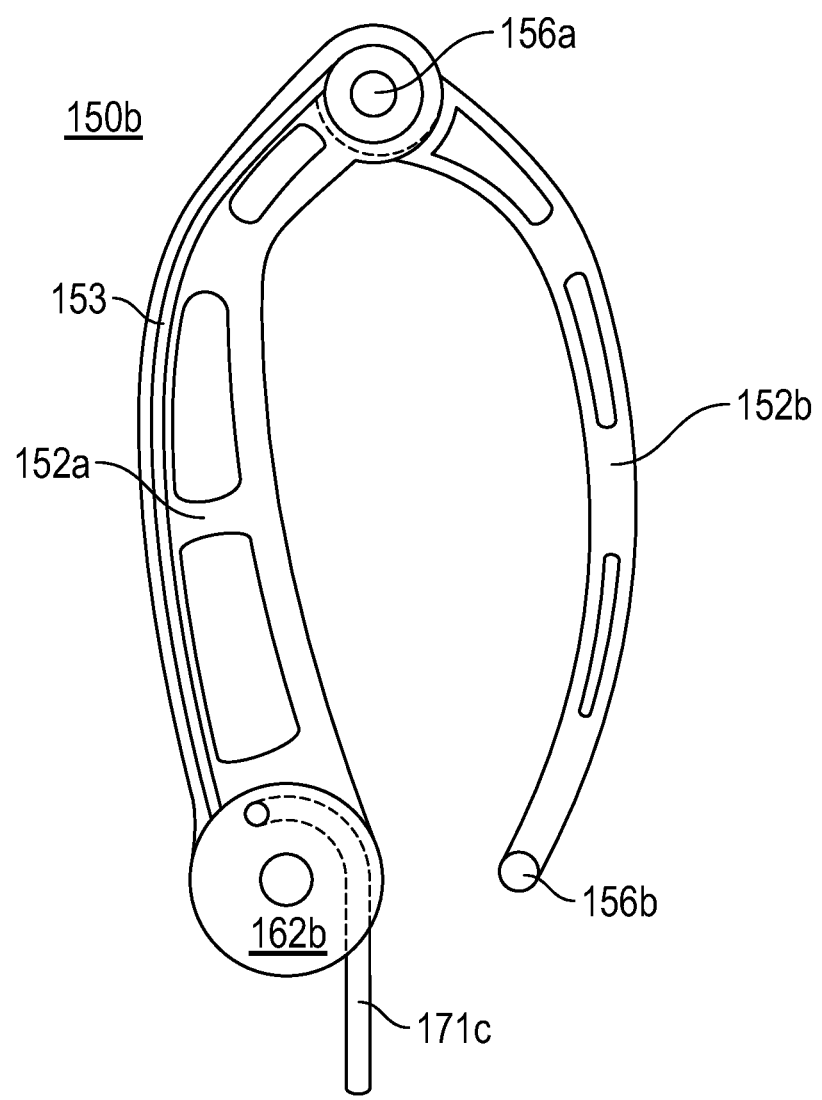
FIG. 1B is a perspective view of half of the wing frame of the flight assembly in FIG. 1A, in accordance with some embodiments.
Figure 2:
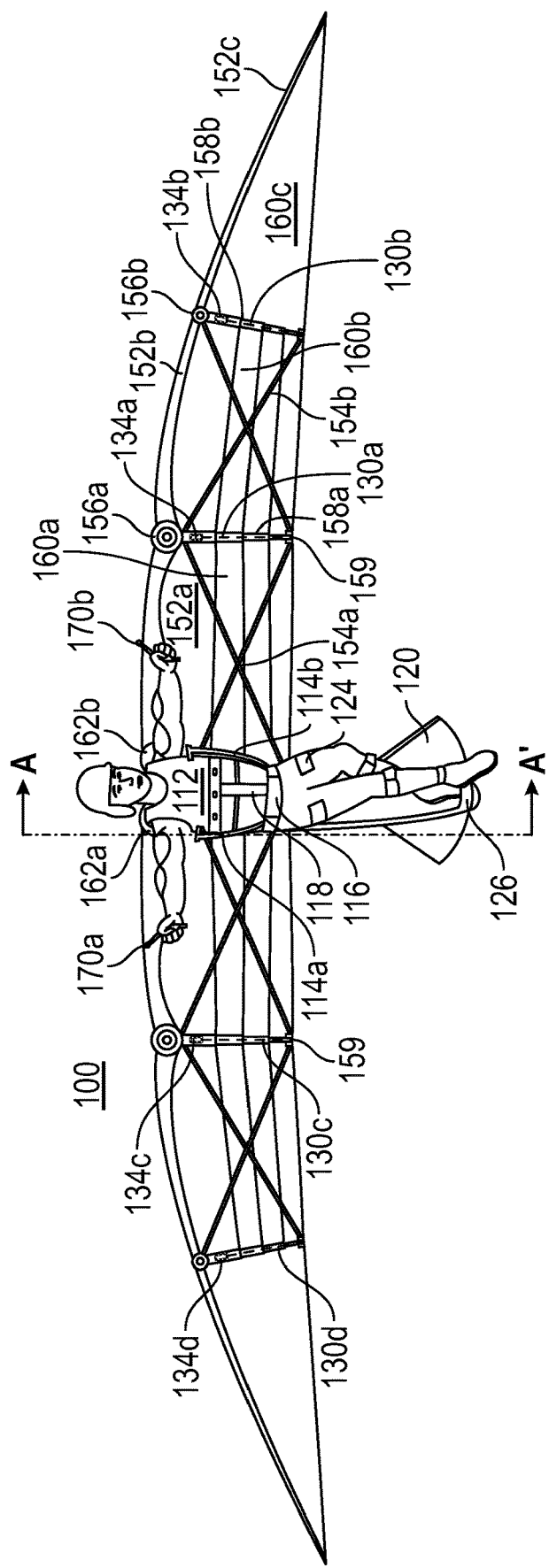
FIG. 2 is a perspective view of the flight assembly of FIG. 1A in the extended wing posture, in accordance with some embodiments.

Specifically with reference to FIG. 1B, a perspective view of half of the wing frame of the flight assembly in FIG. 1A, in accordance with some embodiments is illustrated. In particular, the frame for wing arm 150a includes the primary segment 152a and the secondary segment 152b. In some embodiments, a cable 153 for controlling the retraction and extension of the wing frame 140 couples to the primary joint 156a. A cover, as shown in FIG. 1A, conceals the cable 153 and the wing sail panel sections (to be described with reference to FIG. 2). In operation, when the user desires to extend the wing frame 140, the user actuates a gear assembly (not shown) that converts rotary motion into linear motion, pulling or releasing the tension on cable 153, which enables the retraction and extension of the wing frame 140. More of the details regarding the retraction and extension of the wing frame are described with reference to FIG. 7.

Referring to FIG. 2, a perspective view of the flight assembly of FIG. 1 in the extended wing posture, in accordance with some embodiments, is shown. As disclosed with reference to FIG. 1A, the flight assembly may include a central frame 110, a wing frame 140, and a control lever network (FIGS. 1B, 2, 3A, and 4A; 130a-d, 153, 166, 161a, 161b, 161c, 161d, 190, 165b, 167a, 167a, 164b, 162b, 167b, 170a, 170b, 173a, 173b). The control lever network may be used to place the pair of wings (150a, 150b) in the wing frame 140 in the extended wing posture. In particular, the control lever network may include an arm lever (166) that couples to the top of the side posts 114 within the center frame 110 (to be discussed further in detail with respect to FIG. 3A). The arm lever 166 may include a torsion spring (FIG. 5, 132) and a smaller disc (FIG. 3A, 168) associated with a crankshaft (to be explained in further detail with reference to FIG. 7), which controls the wing mount plate 162, causing it to rotate and shift the attached pair of wings (150a, 150b) in an extended position. When the pair of wings (150a, 150b) of the wing frame 140 drop into the extended wing posture, the disc 159 rotates and slides down the central shaft 158b from the position shown in FIG. 1A of the retracted wing posture to the position in FIG. 2. When the disc 159 slides down, it pulls a set of cables (130a, 130b, 130c, 130d) connected to each one of the concentric rings of tubular columns 158 down; wherein each cable set 130a-d includes a differing cable that separately connects to a tubular column. Particularly, each one of the tubular columns (158a, 158b) may be connected to the wing sail panel sections (160a, 160b, 160c) that were previously housed and concealed within the wing arms (152a, 152b, 152c) under a cover and housing for the wing frame 140. Thereby, when each of the tubular columns (158a, 158b) slide down, the wing sail panel sections (160a, 160b, 160c) are pulled down. In some embodiments, the primary and secondary wing sail panel sections (160a, 160b) may couple directly tubular columns (158a, 158b), while the tertiary wing sail panel section (160c) couples to the secondary wing sail panel section (160b). Further, when the disc 159 (FIG. 1A) rotates, it pulls a set of cross beams (154a) downward for support of the wing sail (160a). A second crossbeam 154b may couple to expose and expand a second wing sail deployment mechanism 158b. In operation, when the second crossbeam 154b is expanded, the tubular columns associated with the second wing sail deployment mechanism 158b shift downward, pulling wing sail panel sections 160b and 160c down to fully deploy the pair of wings (150a,150b).

In some embodiments, wing sail panel sections (160a, 160b, 160c) may include a plurality of cellular panels (not shown), wherein the wing sail panel sections overlap one another. The sail panels 160 may be made of a variety of materials including but not limited to silk, nylon, cotton, polyester, Kevlar, and the like.

In some embodiments, the sail can be divided into one or more differing sections. In particular as shown, the flight assembly 100 described herein includes three different separate sections as shown. It is uniquely designed to roll up and down on separate scroll logs in a rapid manner within each wing arm (152a, 152b, 152c). This function enables the flight assembly 100 to be positioned and poised for achieving the most efficient aerodynamic encounter with the air pressure and its moving air currents.

Further in some embodiments, the control lever network may include a hand-lever 170, which can control the wing geometry adjustment feature of the flying assembly, wherein the angle of the wing frame for a horizontal flight posture and vertical descent posture (more details about the operation of the flight assembly in these two flight postures are given with respect to FIGS. 3A, 4A, 4B, and 6). Additionally, through the use of the hand lever control 170, the parachute (not shown) may be deployed. More details regarding the hand lever control 170 are discussed with reference to FIG. 3A. A forearm control assembly (not shown) may also control wing sale deployment, flight deceleration, and parachute wing conversion. More details regarding the forearm control assembly are described with reference to FIGS. 3A and 3B.

Additionally, as shown in FIG. 2, the central frame 110 may also include a rear post 120 coupled to the shoulder girdle 112 for covering a back portion of the user. Further, the rear post 120 may include a tail fan wing 122 for directional control of the flight assembly.

In some embodiments, the central frame 110 may include a cradle, having gripping arms 124 for legs of the user, wherein the cradle couples to the rear post 120. In some embodiments, the cradle may be a formed within the rear post 120 as shown. Further, the cradle may include a footrest 126 for support of the feet of the user. In contrast, during flight operation when the user is in the horizontal flight posture, the user's feet and legs are inserted within the cradle (124, 126), such that the legs and feet are held snuggly in place within the central frame 110.

In some embodiments, the central frame 110 may include either a horizontal propulsion system and/or a vertical propulsion system. In particular, the horizontal propulsion system may include at least one horizontal thruster (135a-b) positioned along a horizontal axis of the aircraft for providing horizontal thrust during flight. Likewise, the vertical system may include at least one vertical thruster (135a-b) positioned along a vertical axis of the aircraft for providing vertical thrust during flight; wherein the thruster (135a-b) may be positioned horizontally or vertically. The at least one horizontal thruster or vertical thruster (135a-b) may be one of a jet propulsion thruster or a propeller-based thruster including a propeller.

Figure 3A:
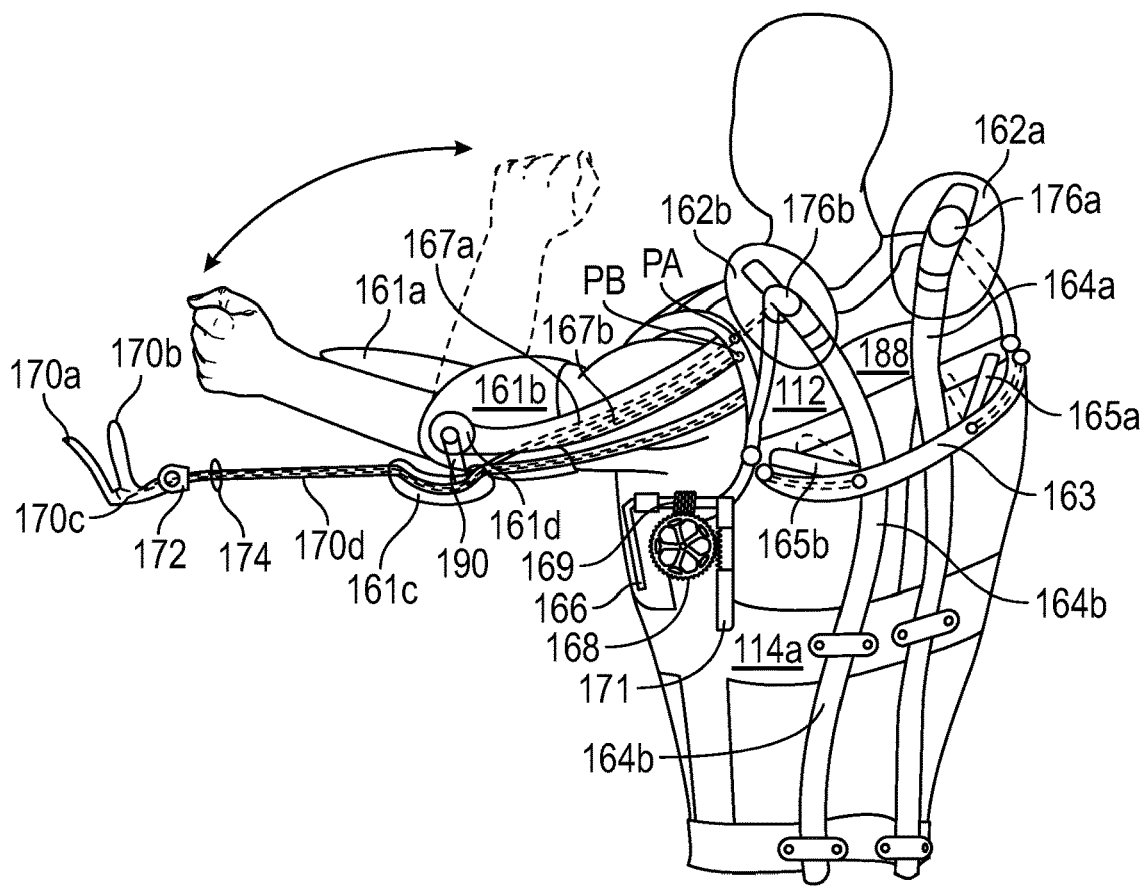
FIG. 3A is a rear view of the central frame of the flight assembly of FIG. 1A having a braking control assembly and a hand control lever for shifting the flight assembly to a vertical descent position, in accordance with some embodiments.
Figure 3B:
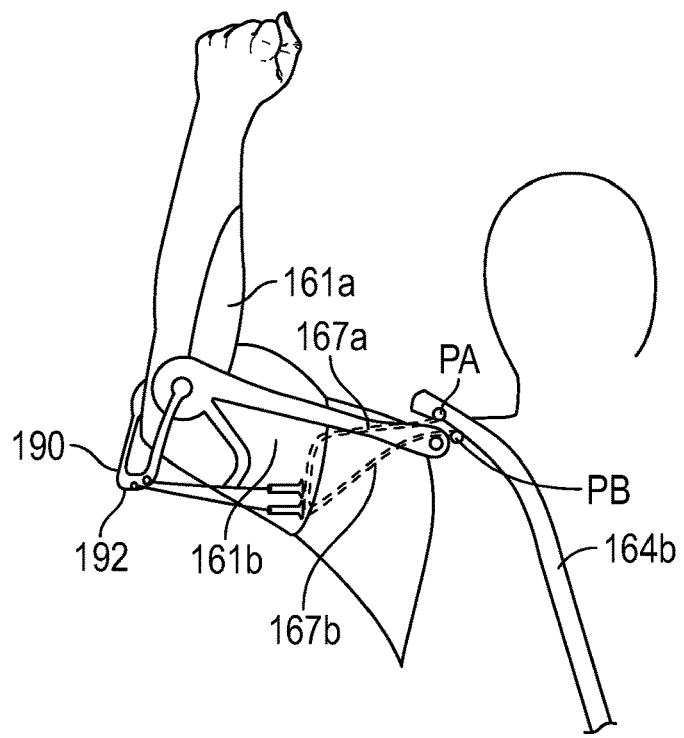
FIG. 3B is a perspective view of the braking control assembly of the flight assembly of FIG. 3A, in accordance with some embodiments.
Figure 4A:
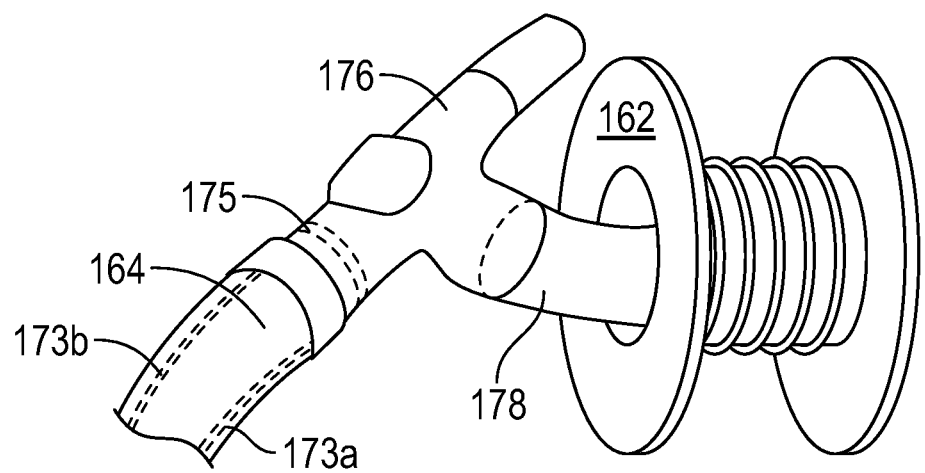
FIG. 4A is a perspective view of a pivot assembly of the flight assembly of FIG. 1A for shifting the flight assembly to a vertical descent position in some embodiments.

Referring to FIG. 3A, a rear view of the central frame of the flight assembly of FIG. 1A having a braking assembly in accordance with some embodiments is shown. As noted in FIGS. 1A and 2, the wing frame 140 may include a wing mount plate (162a, 162b) coupled to the central frame 110. A pair of wing mount bars (164a, 164b), having wing mount posts (described in detail with reference to FIG. 3A), may couple to each respective wing mount plate (162a,162b), wherein a recess within the wing mount plate (162a,162b) couples to receive the wing mount posts on the opposite side of sleeve (176a, 176b). The wing mount bars (164a, 164b) can be coupled to the central frame using coupling members that provide flexible support that enable the wing mount bars (164a, 164b) to pivot when the wings are extended and retracted. This flexibility can also be useful when the wings move from a horizontal flight posture to a vertical descent posture. FIG. 3B displays a perspective view of the braking control assembly of the flight assembly of FIG. 3A. As illustrated in FIGS. 3A and 3B, the forearm control assembly (161a, 161b, 161c, 161d, 190, 167a, 167b) includes cuffs (161a, 161b), elbow pad 161c, elbow gear 161d, a braking lever 190 (having recesses 192), and cables (167a, 167b). Cable 167b couples to an external bar 163. In particular, cable 167b couples between braking lever 190 (at recesses 192) and lift-pull lever 165b; while cable 167a couples between braking lever 190 and a latch (not shown) coupling the wing mount bar 164b to wing mount plate 162b for the purpose of releasing the wing mount bar 164b to have a range of motion. An external bar 163 may include a tension spring (not shown) that couples between the ends of the cable 167b attached to the lift-pull levers 165b. The cuffs (161a, 161b) and elbow pad 161c may be comprised of non-abrasive fabric and padding coupled together, whether, stitched, quilted, and/or glued, in an effort to provide support and protection of the associated parts of the user's arm.

In operation, when the user desires to apply a braking motion or to decelerate the flight assembly, the user may bend his forearm to pull cable 167b, which rotates the elbow gear 161d having the braking lever 190, which rotates perpendicular to the gear 161d pulling the cable 167b. In response, the external bar 163 is shifted in parallel with the shoulder girdle 112, placing lift-pull levers (165a, 165b) in full tilt. As a result, each lever (165a, 165b) remains in a mounted position perpendicular to the shoulder girdle 112. This tilted position of the external bar 163 can tilt the wing frame at various angles to enable drag for the braking feature of the flight assembly 100. In addition, in some embodiments when the user bends his forearm to pull the cable 167a, the wing mount bar 164b can be released from the wing mount plate 162b, such that the wing mount bar 164b exhibits a range of motion for tilting the wings (150a, 150b).

As noted previously, the hand lever control 170 may be used to deploy a parachute from the central frame 110 at high altitudes. As shown, the central frame 110 may include a parachute pouch 188 located with the shoulder girdle 112 and mounted between the wing mount bars (164a, 164b) of the wing frame 140. A second cable (not shown) may couple hand lever control 170 and the parachute pouch 188 containing a parachute. In operation, when the user would like to deploy the parachute, the user can actuate a pulley system (not shown) that opens the parachute pouch 188 and releases the parachute.

Further in FIG. 3A, a perspective view of a hand control assembly of the flight assembly of FIG. 1 in for shifting the flight assembly to a vertical descent position in some embodiments is shown. The hand control assembly including lever 170a, handle 170b, cable 170c, and pulley 172. When the user desires to shift the flight assembly 100 into a vertical position, the user can squeeze the lever 170a and the handle 170b to pull the cable 170c attached to the pulley 172 within bar 170d. In addition, cable 170c can be indirectly attached to the wing mount bar (164b). In some embodiments, the hand control assembly may further include a hydraulic pump 174 for additional force to shift the wings for vertical positioning.

In some embodiments, the control lever network may include an arm lever 166 that can be coupled to the side brace 114. It is responsible for extending and retracting the wing frame. In particular, the control lever network may include an arm lever 166 that couples to a side post (114a, 114b) within the center frame 110. The arm lever 166 may include a torsion spring (not shown) and a smaller disc 168 associated with a crankshaft. Accordingly, when the user shifts the lever with his arm, the crankshaft causes the smaller disc 168 to rotate. In response, the wing mount plate 162 rotates and shifts the attached pair of wings (150a, 150b) in an extended position.

In operation, when the arm lever 166 is lifted up, the gear 168 is rotated along a track 171a in extension lever 171b by pulling of the cable (not shown) concealed within the upper arm lever 166. In some embodiments, the gear 168 may be actuated by an inner gear, which makes contact with the tract 171*a* within the extension lever 171*b* (shown in FIG. 5). Accordingly, the rotary motion of gear 168 can be translated into linear motion, effectively pulling cable 153 (shown in FIGS. 1A and 5), ultimately extending the wing frame 140 into the extended position of FIG. 2. The arm lever 166 will be described in greater detail with reference to FIG. 5.

In some embodiments, the shoulder girdle 112 includes a pulley (not shown) and a cable (not shown) that are apart of the control lever network. In particular, the pulley may include a cable wrapped around it; both of which may be located within the shoulder girdle 112. When the cable having a torsion spring coupled thereto is released, the cable will swing out and shift the wings into a vertical flight posture as shown in FIG. 6.

Figure 4B:
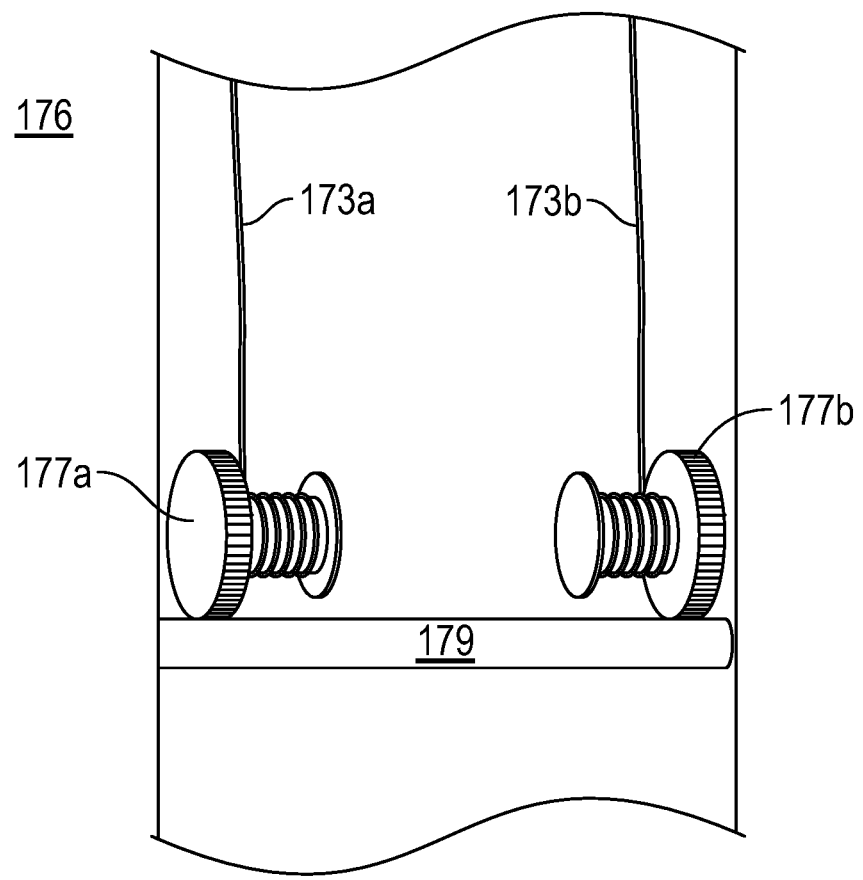
FIG. 4B is a perspective view of the internal gear system of the pivot assembly of FIG. 4A for generating motion in some embodiments.

Now referring to FIG. 4A, a perspective view of a pivot assembly of the flight assembly of FIG. 1A for shifting the flight assembly to a vertical descent position in some embodiments is shown. In particular, a right and left pivot assembly couples to the left and right wing mount bars (164*a* and 164*b* of FIG. 3A), wherein 164 can represent 164*a* and/or 164*b*. Similarly, elements 162 and 176, can represent either the right or the left wing mount plate (162*a*, 162*b*) or the right or left sleeve (176*a*, 176*b*). The pivot assembly may include a sleeve 176, gear assembly 175, and wing mount post 178. The sleeve 176 may couple to the wing mount bar 164 having cables (173*a*, 173*b*) that couple to the hand control assembly (170*a*, 170*b*, 170*c*). In particular, FIG. 4B shows a perspective view of the internal gear assembly 175 of the pivot assembly of FIG. 4A for generating motion in some embodiments is shown. As shown, the sleeve 176 may house the gear assembly 175 that can include a pair of primary gears (177*a*, 177*b*) and fixed gear 179. In operation, when the user decides to shift the flight assembly in a vertical position, the user can shift the hand control assembly (170*a*, 170*b*, 170*c*) to pull the cable 170*c* attached to cables (173*a*, 173*b*) that pull primary gears (177*a*, 177*b*), which rotate fixed gear 179. When fixed gear 179 is rotated, the entire sleeve 176 can rotate, which rotates the wing mount bar 164 that is coupled therein. Accordingly, when the wing mount bar 164 rotates within the wing mount plate 162, the wing frame 140 pivots to the position for vertical positioning of the flight assembly.

Figure 5:
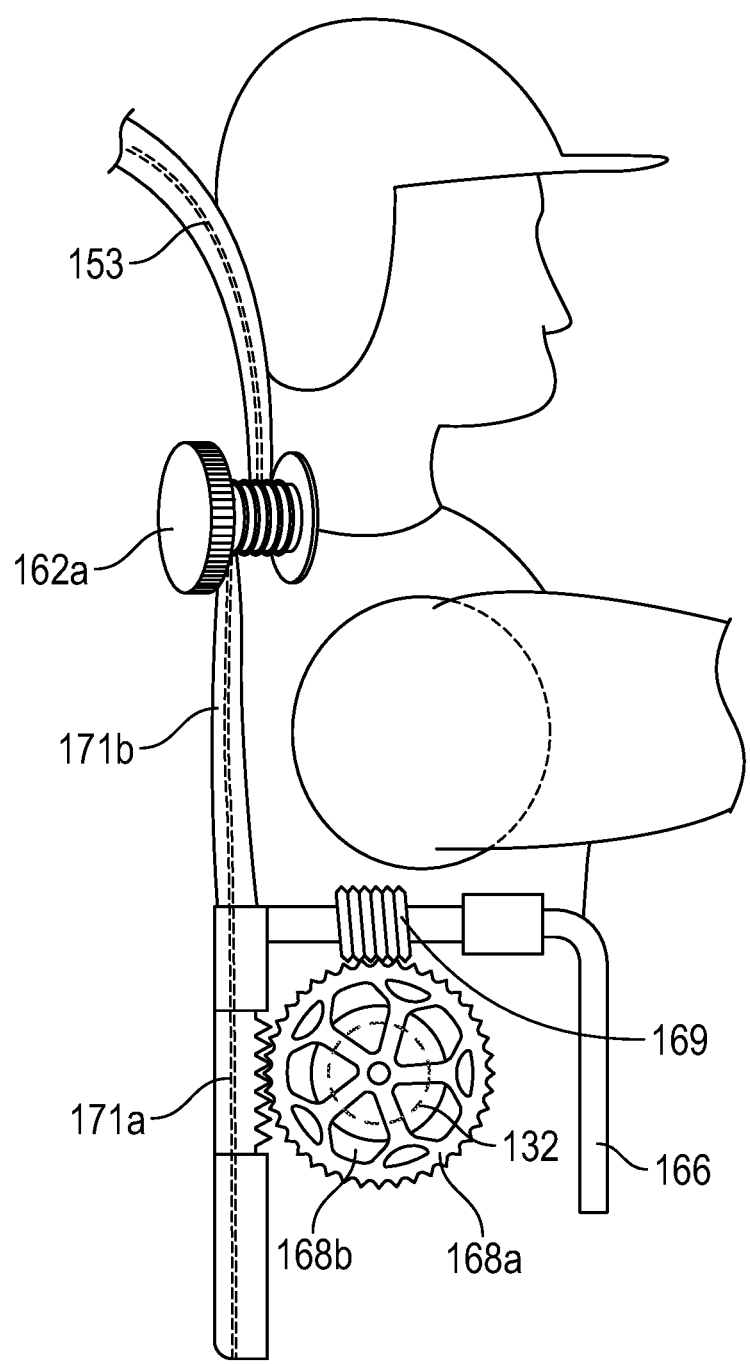
FIG. 5 is a perspective view of a control lever network of the flight assembly of FIG. 1A for extending the wing frame in some embodiments.

Referring to FIG. 5, a perspective view of a control lever network of the flight assembly of FIG. 1A for extending the wing frame in some embodiments is shown. The control lever network may include an upper arm lever 166 that couples to a crankshaft 168. The crankshaft 168 may be comprised of a worm gear 169, an inner gear 168*b*, and an outer gear 168*a*. The crankshaft 168 may couple to the wing frame 140 indirectly by coupling to the wing mount plate 162. The arm lever 166 may include a torsion spring (FIG. 5, 132) and a smaller disc 168 associated with a crankshaft. Accordingly, when the user shifts the arm lever 166, the crankshaft causes the inner gear 168*b* to rotate. In response, the wing mount plate 162 rotates and shifts the attached pair of wings (150*a*, 150*b*) in an extended position In operation, when the arm lever 166 is lifted up, the gear 168 is rotated along a track 171*a* in extension lever 171*b* by pulling of the cable within the extension lever 171*b* and concealed within the upper arm lever 166. In particular, the worm gear 169 may turn the inner gear 168*b* that is connected to the outer gear 168*a*, which makes contact with the tract 171*a* within the extension lever 171*b*. The rotary motion is translated into linear motion to pull the cable 153, ultimately extending the wing frame 140 into the extended position of FIG. 2.

Figure 6:
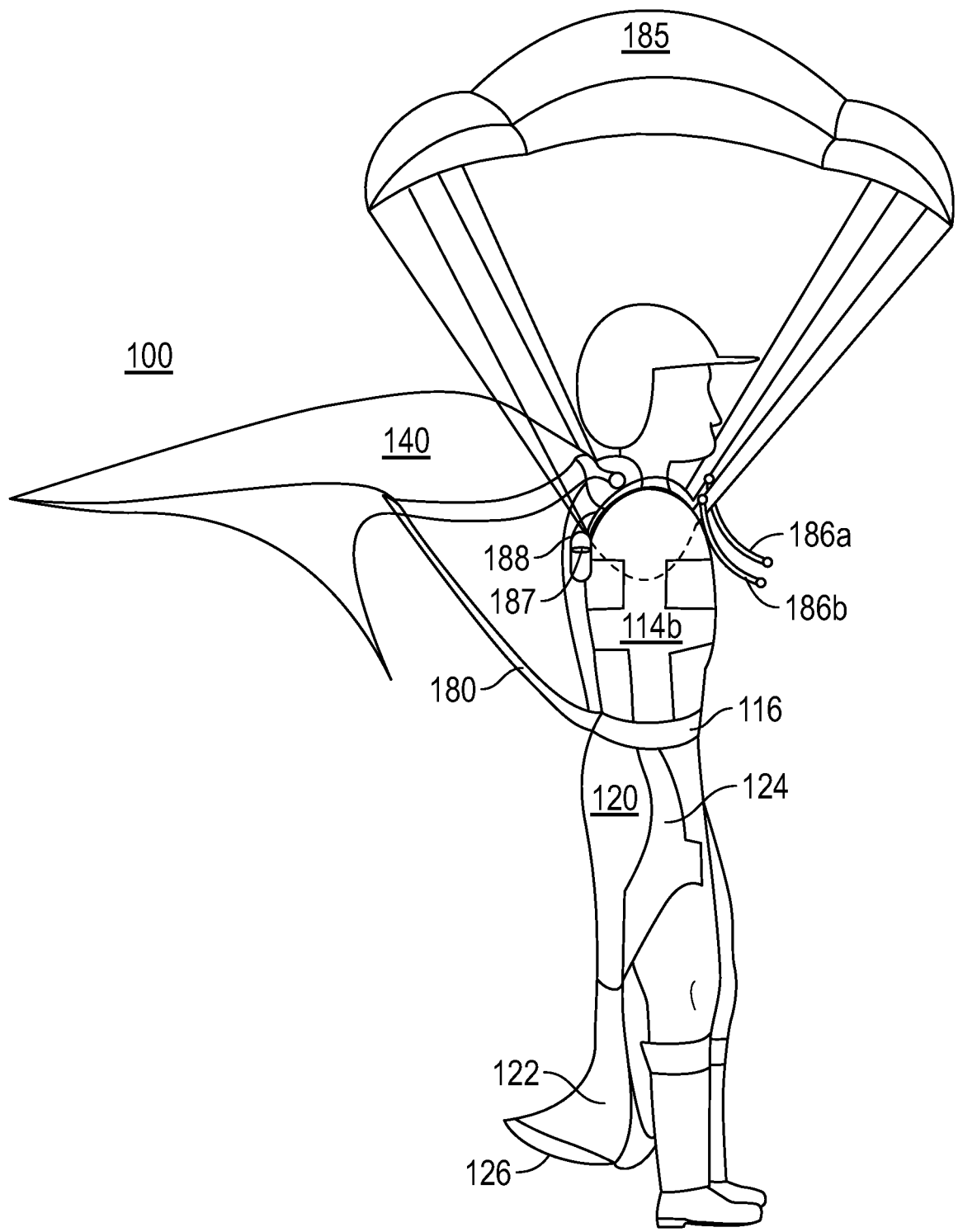
FIG. 6 is a side view of the flight assembly of FIG. 1A in the vertical descent wing posture along cut line A-A' in some embodiments.

Referring to FIG. 6, a side view of the flight assembly of FIG. 1A in the vertical descent wing posture along cut line A-A' in some embodiments is shown. As noted previously, the hand lever 170 can control the wing geometry adjustment feature of the flying assembly, wherein the angle of the wing frame 140 for a horizontal flight posture and vertical descent posture is adjusted. The hand lever control may also control parachute wing conversion, wherein the parachute 185, having a wing-shaped sail and a pair of guide straps (186*a* 186*b*), may be deployed. In particular, the hand lever 170 can control the wings to be in the position perpendicular to the ground similar to a hang-gliding position as shown in FIG. 6. In the in-flight (horizontal) wing posture (shown in FIG. 2), the user can adjust the hand lever 170 to control the wings to be in the position parallel to or at an angle less than 90 degrees to the ground. As shown, the belt 116 may include a pulley having a cable 180 wrapped around the same. In some embodiments, the cable 180 can be attached to the hand lever 170 and the wing frame 140. When the cable 180 having a torsion spring is released, the wings will shift into a vertical flight posture as shown in FIG. 6.

During flight operation, when the user would like to fly with the wings, the user can first tuck his legs in the cradle 124 with his feet in the feet rest 126. In particular, the pilot's lower extremity can be fully supported and maintained in the horizontal flight posture with the legs tucked in the cradle 124 and feet rest 126. Particularly, during flight, the cradle 124 hugs the legs and thighs of the pilot; while the feet are kept secure in the footrest 126. Further during flight, when the user would like to have the unit to function as a hang glider, the user may shift the hand lever 170. In response, the cable 180 will adjust to lengthen and detach the wing frame 140 from the central frame 110 at the belt 116 portion as shown in FIG. 6. Next, the user can set the hand lever 170 to shorten the cable 180 such that the wing frame 140 is reattached to the central frame 110 at the belt 116 portion. In some embodiments, when the user is ready to land, the user can motion his legs to flex forward with sufficient force against the cradle levers 124 and immediately the rear post 120 shifts to either a semi-vertical posture or a full vertical posture for convenient touchdown as shown in FIG. 6.

In some embodiments, the parachute 185 seated within the pocket 175 of the shoulder girdle 112 may be deployed during the vertical descent wing posture at high altitudes. In some embodiments, the hand control lever 170 may be used to release the parachute 185 from the parachute pouch 188.

Figure 7:
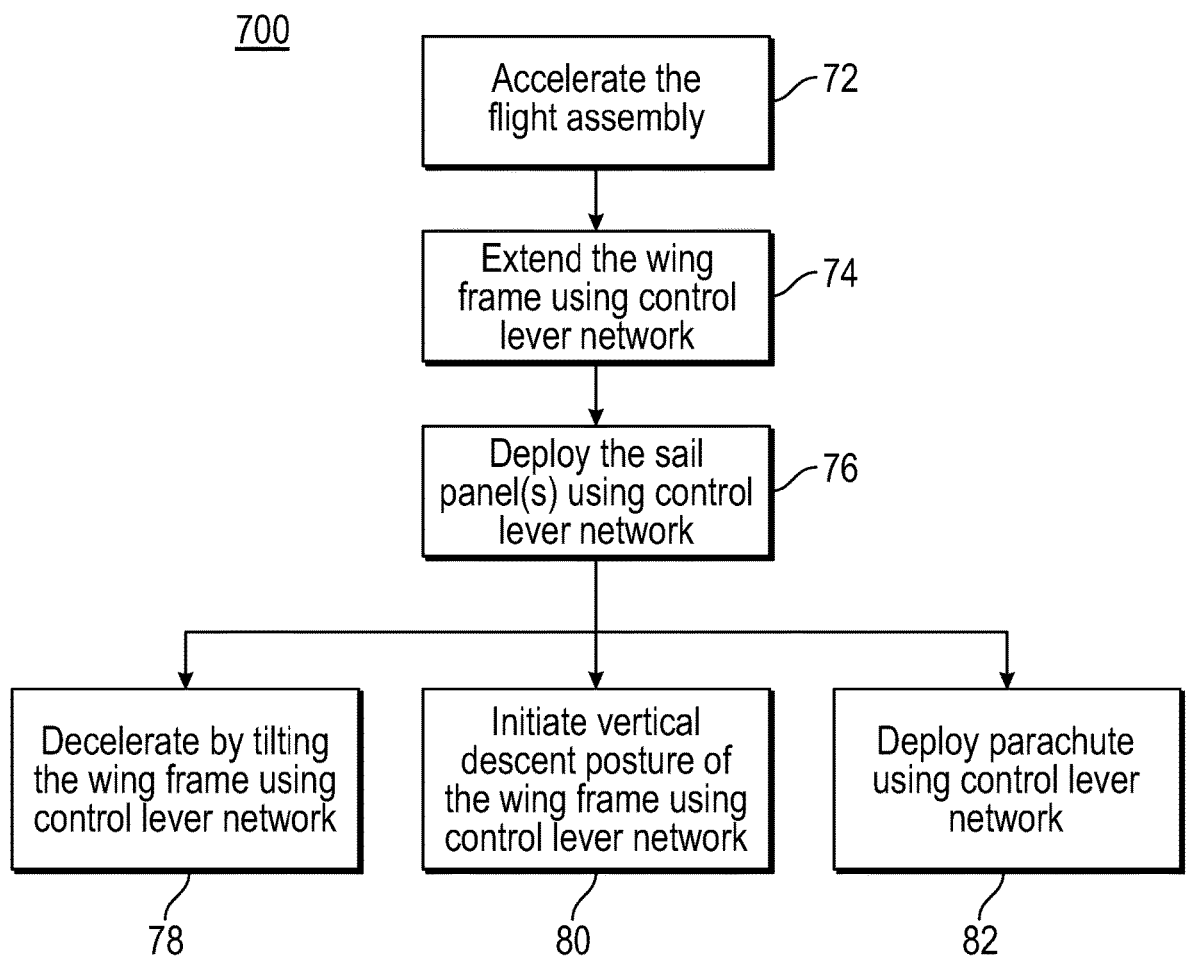
FIG. 7 is a flow diagram of a method for fight in accordance with some embodiments.

Referring to FIG. 7, a flow diagram of a method for fight in accordance with some embodiments is shown. In an action 72, the flight assembly may be accelerated. For example, a user may run through the air or leap off of an elevated rise. In the alternative, a jet propulsion may be used to accelerate the fight assembly. In an action 74, the pair of wings of the wing frame may be extended, in response to the adjustment of an upper-arm lever, which couples to the pair of wings and the wing frame. For example, the central frame may include the upper-arm lever for the purpose of adjusting a crankshaft coupled to a wing mount plate of the wing frame. When the lever is adjusted, the crankshaft shifts and in response, the wing mount plate rotates. In response, the pair of wings coupled to the wing mount plates may rotate and extend outward. In an action 76, the method may include deploying one or more sail panels housed with the pair of wings, in response to the toggling of a sail lever coupled to the sail panels. For example, in response to the toggling of the sail lever, a wing sail deployment mechanism may actuate the sail panels housed within the wing arms of the wing frame. Further, there are three optional methods for bring the flight to an end. In particular, the method for flight in accordance with some embodiments may include the actuation of a forearm control lever to control flight deceleration and tilting the angle of the pair of wings to generate drag in an action 78. Additionally, the method for flight in accordance with some embodiments may include the actuation of the hand lever to initiate vertical descent posture of the flight assembly in an action 80. For example, the method may include releasing the pair of wings from a fixed position during flight, wherein the wings are coupled to the wing frame in the fixed position. It may also include lengthening a cable that connects the wing frame to a central frame of the flight assembly to shift the central frame perpendicular to the ground. Moreover, in an action 82, the method for flight in accordance with some embodiments may include releasing a parachute latch in response to actuating a hand lever and deploying the parachute in response to the released parachute latch.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A flight apparatus comprising:
    a central frame to encapsulate a user, a first portion to encapsulate the user's torso and a second portion to cradle the user's legs and feet;
        wherein the second portion of the central frame further comprises:
        a cradle, having gripping arms, for legs of the user, the cradle coupled to the rear post;
        a tail fan wing coupled to the cradle for directional control of the flight apparatus; and
        a foot rest coupled to the cradle for feet of the user;
    a wing frame coupled to the central frame, the wing frame having a pair of wings with one or more pivotal connections; and
    a control lever network having a set of cables coupled to a plurality of levers, wherein the control lever network couples between the wing frame and the central frame to control extension and retraction of the pair of wings at the pivotal connections.

2. The flight apparatus of claim 1, wherein the first portion of the central frame comprises:
    a shoulder girdle for coupling across shoulders of the user;
    a front brace coupled to the shoulder girdle for covering a frontal torso portion of the user;
    a pair of side braces coupled to the shoulder girdle for covering a ribcage portion of the user;
    a rear post coupled to the shoulder girdle for covering a back portion of the user; and
    a belt coupled to the rear post, the pair of side braces, and the front brace to secure the central frame in place on the user.

3. The flight apparatus of claim 2, wherein the central frame further comprises:
    a horizontal propulsion system to accelerating the flight apparatus horizontally.

4. The flight apparatus of claim 3, wherein the horizontal propulsion system comprises:
    at least one horizontal thruster positioned along a horizontal axis of the central frame for providing horizontal thrust during flight.

5. The flight apparatus of claim 4, wherein the at least one horizontal thruster is one of a jet propulsion thruster or a propeller-based thruster including a propeller.

6. The flight apparatus of claim 2, wherein the central frame further comprises:
    a vertical propulsion system to accelerating the flight apparatus vertically.

7. The flight apparatus of claim 6, wherein the vertical propulsion system comprises:
   at least one vertical thruster positioned along a vertical axis of the aircraft for providing vertical thrust during flight;
   wherein the at least one vertical thruster is one of a jet propulsion thruster or a propeller-based thruster including a propeller.

8. The flight apparatus of claim 1, wherein the wing frame comprises:
   a pair of mount bars, each having a mount post;
   a pair of mount plates, each having a recess, the pair of mount plates coupled to the central frame, wherein each mount post of the pair of mount bars is slidably coupled with a respective one of each recess;
   a pair of wing arms, each having a primary portion, a secondary portion and a tertiary portion, wherein the primary, secondary and tertiary portions each include a retractable wing sail panel having a plurality of engagable cell portions; and
   a wing sail deployment mechanism coupled between the primary and secondary portions of the pair of wing arms for extending and retracting the retractable wing sail panel of the primary and secondary portions, wherein the wing sail panel of the tertiary portion couples to the wing sail panel of the secondary portion to extend and retract synchronously with the wing sail panel of the secondary portion.

9. The flight apparatus of claim 8, wherein each wing sail deployment mechanism further comprises:
   a joint coupling the primary portion and secondary portion of respective each one of the pair of wing arms;
   a central shaft coupled to the joint;
   one or more concentric tubular columns slidably coupled to the central shaft;
   a disk coupled to the central shaft for prohibiting the motion of the one or more concentric tubular columns when the wing frame is retracted; and
   a torsion spring coupled to the disk to release the motion of the one or more concentric tubular columns when the wing frame is extended.

10. The flight apparatus of claim 1, wherein the control lever network comprises:
    an upper-arm lever coupled to the wing frame to extend and retract the wing frame;
    a lift-pull lever coupled to the wing frame by a first cable to tilt the wing for enhancing drag to implement braking of the flight apparatus; wherein when the lift-pull lever is engaged, the wing frame is pulled by the first cable to a tilted position; and
    a hand control lever coupled to a second cable to disengage the wing frame from the central frame for vertical descent; wherein when the hand control lever is engaged, the second cable pulls the wing frame and the wing frame is disengaged from the central frame.

11. The flight apparatus of claim 10, wherein the hand-control lever further comprises:
    a third cable coupled to the wing frame, wherein when the hand-control lever engages the third cable, the wing frame disconnects from the central frame to tilt the wing for parachute deployment.

12. The flight apparatus of claim 1, further comprises:
    a parachute coupled to the central frame, wherein the parachute is folded and seated within a pocket of the central frame; and
    a parachute control mechanism for deploying the parachute.

13. The flight apparatus of claim 12, wherein the parachute comprises:
    a wing-shaped sail; and
    a pair of guide straps coupled to the wing-shaped sail for directing the parachute.

14. The flight apparatus of claim 1, further comprising:
    a garment suit to cover the user; the garment suit having coupling members to couple the garment suit to the central frame and the wing frame; and
    a helmet coupled to the garment suit.

15. A method of flight using a flight assembly comprising:
    accelerating the flight assembly worn by a user through the air;
    extending, in response to adjusting an upper-arm lever, a pair of wings coupled to a wing frame of the flight assembly, wherein the pair of wings, each having one or more sail panels, extend from a retracted position;
    deploying, in response to toggling a sail lever, the one or more sail panels housed within the pair of wings
    releasing the pair of wings from a fixed position during flight of the wing frame, in response to actuating a hand lever to initiate vertical descent posture of the flight assembly; and
    lengthening a cable connecting the wing frame to a central frame of the flight assembly to shift the central frame perpendicular to the ground.

16. The method of claim 15, further comprising:
    actuating flight deceleration in response to engagement of a lift-pull lever, wherein the pair of wings are tilted at an angle to generate drag.

17. The method of claim 15, further comprising:
    releasing a parachute latch, in response to actuating a hand lever; and
    deploying the parachute.

* * * * *